(12) United States Patent
Curtis

(10) Patent No.: US 6,178,814 B1
(45) Date of Patent: Jan. 30, 2001

(54) PORTABLE MOTORIZED TIRE SUPPORT

(76) Inventor: John Michael Curtis, R.D. #1 Box 227J, Cowansville, PA (US) 16218

( * ) Notice: Under 35 U.S.C. 154(b), the term of this patent shall be extended for 0 days.

(21) Appl. No.: 09/241,574

(22) Filed: Feb. 1, 1999

Related U.S. Application Data

(63) Continuation-in-part of application No. 08/916,394, filed on Aug. 22, 1997, now Pat. No. 6,089,083.

(51) Int. Cl.⁷ .................................................. G01M 17/02
(52) U.S. Cl. .............................................................. 73/146
(58) Field of Search .............................. 73/8, 146, 146.2, 73/650; 152/375, 378 R, 379.3

(56) References Cited

U.S. PATENT DOCUMENTS

| | | |
|---|---|---|
| 3,899,917 | 8/1975 | Kisbany . |
| 4,348,891 | 9/1982 | Stickler et al. . |
| 4,404,848 | 9/1983 | Iwama et al. . |
| 4,969,355 | 11/1990 | Doi et al. . |
| 5,107,703 | 4/1992 | Ota . |
| 5,197,200 | 3/1993 | Bahr et al. . |
| 5,313,827 | 5/1994 | Yovichin . |
| 5,448,910 | 9/1995 | Yurjevich et al. . |
| 5,460,036 | 10/1995 | Church . |
| 5,777,219 | 7/1998 | Popio et al. . |
| 5,789,668 | 8/1998 | Coe et al. . |

*Primary Examiner*—William Oen
(74) *Attorney, Agent, or Firm*—Aileen Champion Addessi

(57) ABSTRACT

A tire support device for automobile racing tires is a self contained unit which can be conveniently transported and used at a race track or other location for mounting the tire for enabling a person to conveniently and easily perform various procedures on the tire, such as measuring the circumference, run out, and wear of an automobile tire or for preparing the surface of the tire. The mount includes an elongated member for elevating the tire above the ground. The tire support device further includes a mount having a rotatable member for rotating the tire while supported by the mount. A motor can be connected to the rotatable member for rotating the tire and improving the efficiency of the process. A clutch attached to the motor and to the rotatable member enables the tire to be automatically or manually rotated. The mount may be pivotally attached to the base for enabling the tire to be positioned in either a horizontal or vertical position. The tire is secured to the rotatable member by alignment pins inserted through holes in a cap and a tire base of the tire support device and through holes in the wheel of the tire.

20 Claims, 9 Drawing Sheets

PORTABLE MOTORIZED TIRE SUPPORT

This is a Continuation-in-part of U.S. application Ser. No. 08/916,394 filed Aug. 22, 1997, now U.S. Pat. No. 6,089,083.

BACKGROUND OF THE INVENTION

The invention relates to automobile racing and, more particularly, to a device for mounting a tire.

During automobile racing, the tires of a racing car are continuously checked for variations in dimensions due to changes in temperature, pressure, the condition of the race track, or other conditions. To perform these inspections or to repair the surface of the tire, the tire needs to be supported for a person to easily access the surface of the tire.

Some automobile racing crews manually check the circumference of the tires by wrapping a tape measure around the tire. Due to various conditions of a race track, debris is removed from the tire by hand using a scraper tool, and the surface of the tire is roughed up by hand using a wire brush or grinder.

There are several kinds of devices for mounting objects. One such device is disclosed in U.S. Pat. No. 5,460,036 to Church. The tire inspection apparatus includes a base, rotatable rollers, and a tire support structure. However, the tire support structure may only be used to rotate a tire resting upright on the support structure, and the tire is not fastened to the rotatable member.

U.S. Pat. No. 4,969,355 to Doi and U.S. Pat. No. 5,777,219 to Popio disclose mounting devices for tires having pivots for altering the angular position of a rotational member. However, due to the design of the mounting devices, the pivotal movement is limited to slight arching. The Doi device is constrained by the vertical movement of the drum, enabling the tire to only be raised or lowered, and the Popio device is limited by the load mechanisms which are attached to the device and is designed to impart a camber or slight arch to the tire.

Therefore, what is needed is an apparatus for mounting a tire which is transportable, rotatable and includes a pivot for positioning the tire either horizontally or vertically for providing an accurate and convenient means for measuring and/or preparing the tire.

SUMMARY OF THE INVENTION

A tire inspection and preparation device includes a mount having an elongated member for supporting a tire in spaced apart relation to a support surface, a rotatable member rotatably attached to the elongated member for rotating the tire about an axis, and a fastener coupled to the rotatable member for securing the tire to the mount. A support arm is attached to the mount and includes a first arm adjustably attached to the mount and extending substantially perpendicular to the elongated member, and a second arm adjustably attached to the first arm and extending substantially perpendicular to the first arm. At least one tool is interchangeably attached to the second arm for contacting the tire.

One embodiment includes the tool being a contact wheel. The tool includes a bracket attached to the second arm and having a reference marking for alignment with a reference marking on the tire for determining a revolution of the tire. An encoder is attached to the wheel for measuring rotation of the wheel and producing a signal, and a counter is electrically connected to the encoder for receiving the signal from the encoder and determining a circumference of the tire.

As an alternative to the use of the contact wheel, a dial indicator may be attached to the bracket for contacting the tire for measuring run out of the tire and wear of the tire.

As another alternative, a preparation tool may be attached to the support arm for removing debris from the tire or scuffing the surface of the tire. A first motor may be coupled to the mount for automatically rotating the tire and a second motor may be coupled to the tool for rotating the tool.

An alternative embodiment of the mounting system is a portable, rotatable tire support for mounting a tire including a base having a first arm, a second arm, and a first extension. The first and second arms rest on a support surface and have the second arm removably attached to the first arm and positioned substantially perpendicular to the first arm. The first extension is attached to the first arm and extends substantially perpendicular to and vertically upwardly from the first arm.

A mount is removably attached to the first extension of the base and has an elongated member attached to the first extension and extending substantially vertically upwardly for supporting the tire in spaced apart relation to the support surface. The mount further includes a rotatable member rotatably attached to the elongated member for rotating the tire about an axis, and a fastener coupled to the rotatable member and rotatable with the rotatable member for securing the tire to the mount and enabling rotation of the tire, the fastener and the rotatable member.

The mount is pivotally attached to the base by a connector which is mateably connectable with a protuberance on the mount. The connector and the mount each have a first bore and a second bore which are alignable. A connector pin is disposed within the first bores of the connector and the mount for enabling the mount to rotate about the connector pin, and a pin is engagable within the second bores of the connector and the mount for securing the mount in an upright, non-pivoted position.

The mount may be pivoted through approximately 90° for positioning the tire both horizontally and vertically.

The tire support further includes a tire base having at least one hole alignable with at least one hole of the wheel of the tire and being rotatably attached to the elongated member. A cap has at least one hole alignable with the at least one hole of the wheel of the tire, and an alignment pin is sized and adapted to be disposed through each of the aligned holes of the wheel, the cap, and the tire base for coupling the tire and the rotatable member together.

A motor is attached to the rotatable member for rotating the rotatable member and the tire, and a clutch is attached to the rotatable member and to the motor and has a first position for enabling the rotatable member to be manually rotated and has a second position for enabling the rotatable member to be rotated automatically with the motor.

The tire support further includes a second extension attached to the base and extending vertically upwardly and substantially perpendicular to the first arm and extending substantially parallel to the first extension. The second extension has a support surface for contacting the elongated member of the mount for supporting the mount in a pivoted position.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

Figure 1:
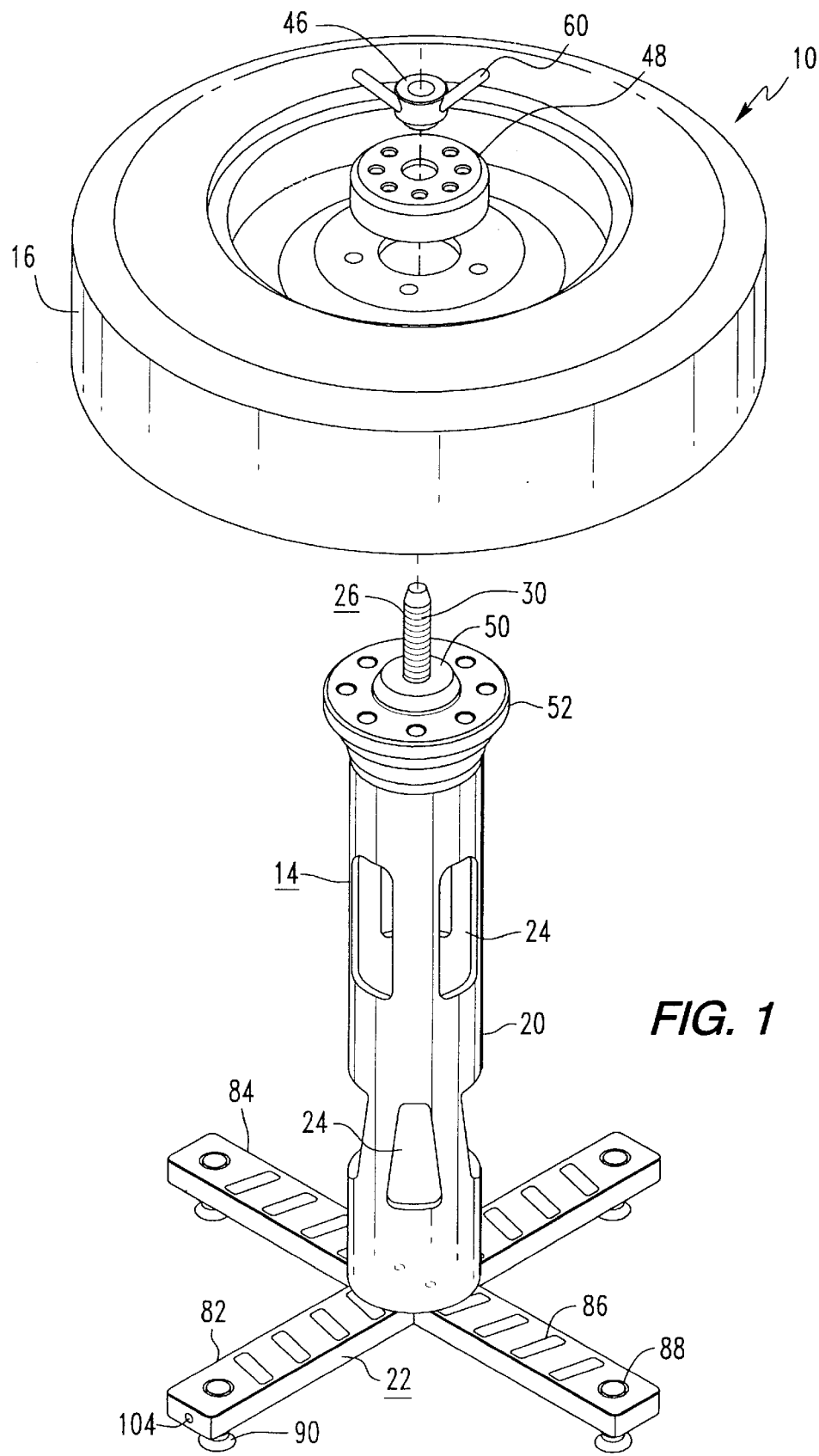
FIG. 1 is a partially exploded isometric view of a tire inspection and preparation device.
Figure 2:
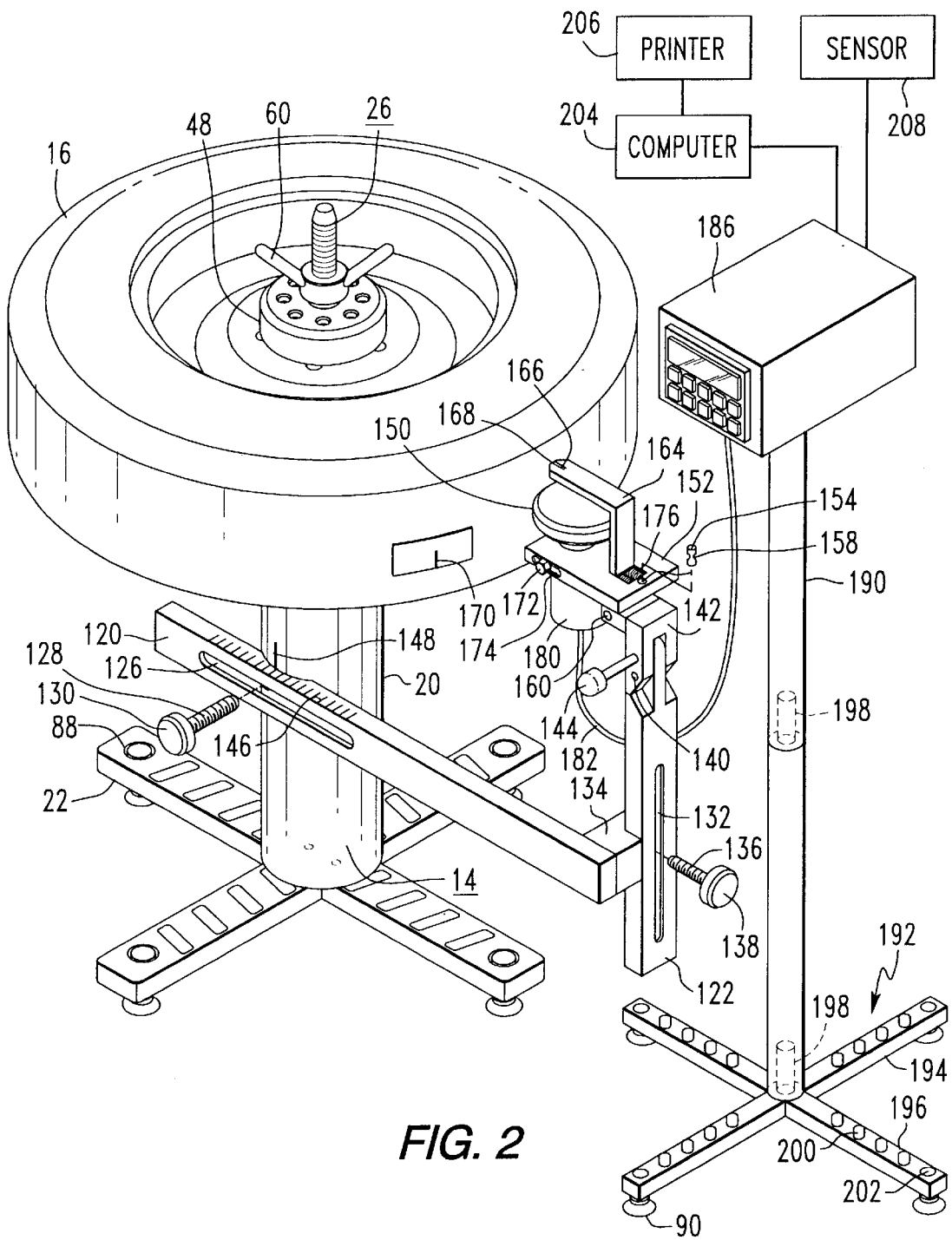
FIG. 2 is an isometric view of the tire inspection and preparation device showing a wheel assembly contacting a tire.
Figure 3:
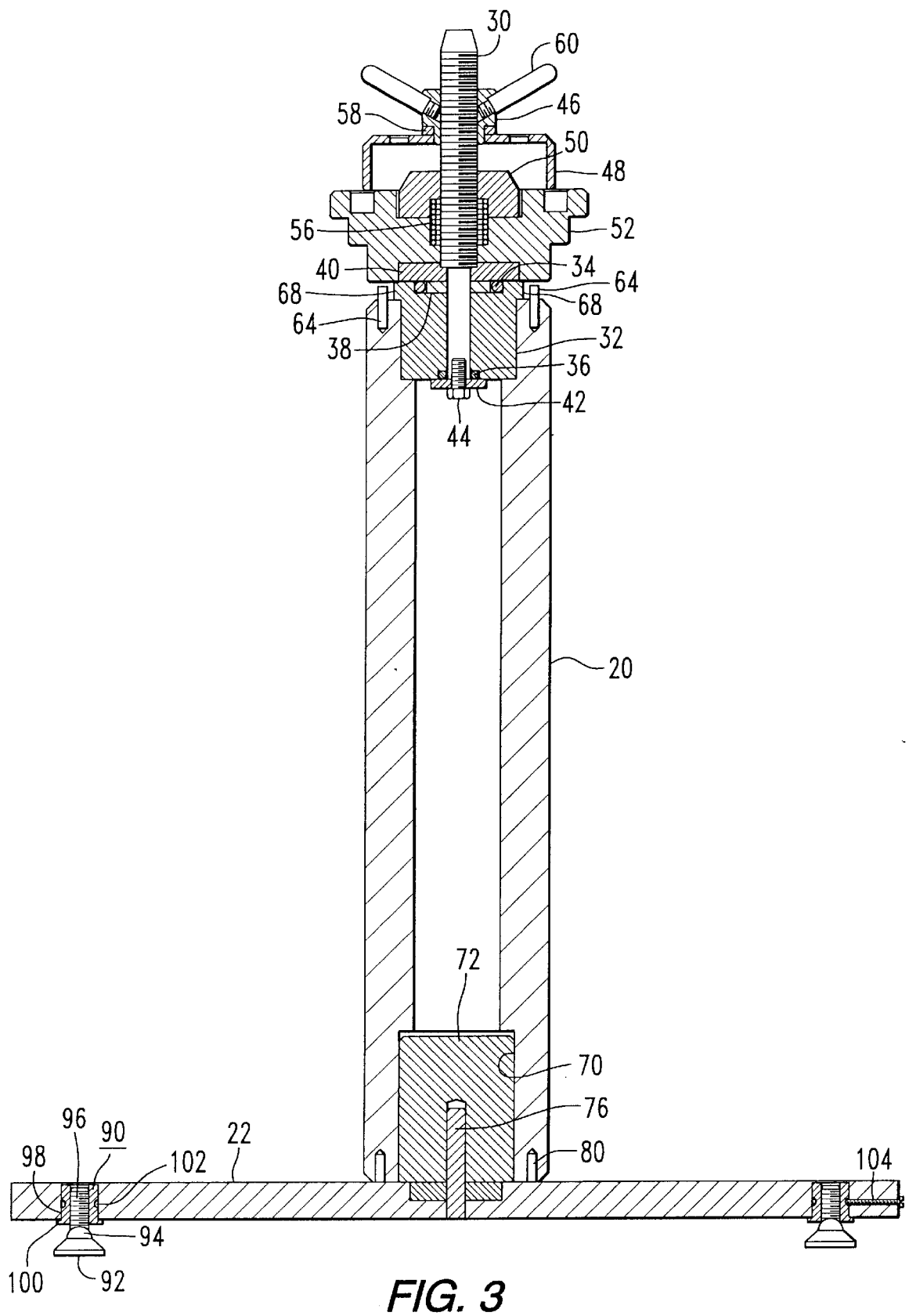
FIG. 3 is a cross-sectional view of the tire inspection and preparation device.
Figure 4:
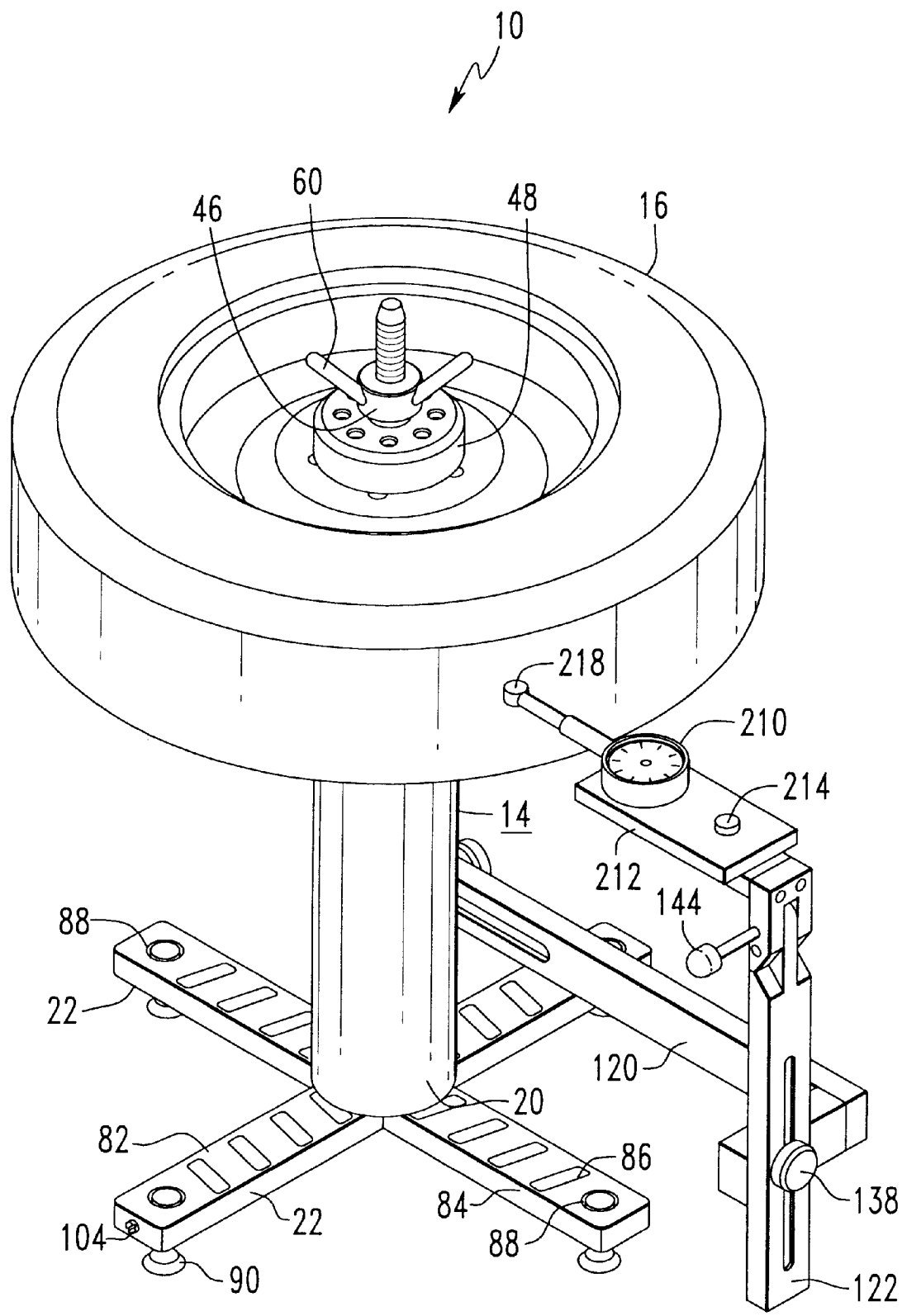
FIG. 4 is an isometric view of the tire inspection and preparation device showing a dial indicator contacting the tire.
Figure 8:
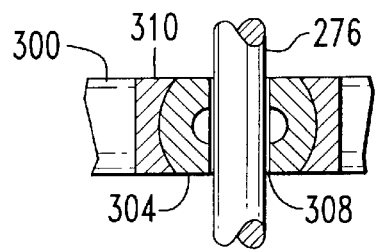
FIG. 8 is a partial cross-sectional view of a pivot bushing.
Figure 5:
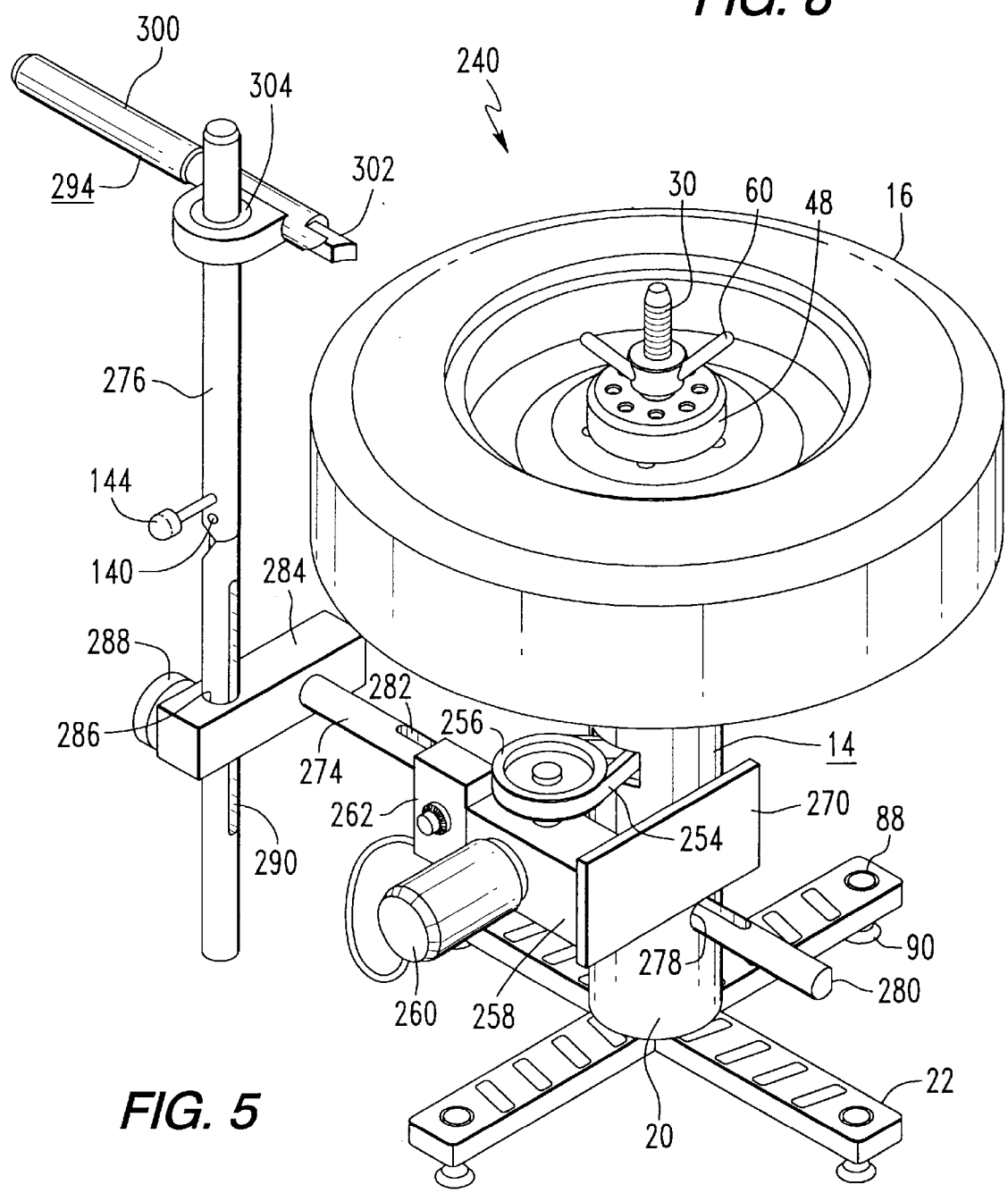
FIG. 5 is an isometric view of an alternative embodiment of the tire inspection and preparation device showing a motor assembly attached to a mount of the tire inspection and preparation device and a cutting tool contacting the tire.
Figure 6:
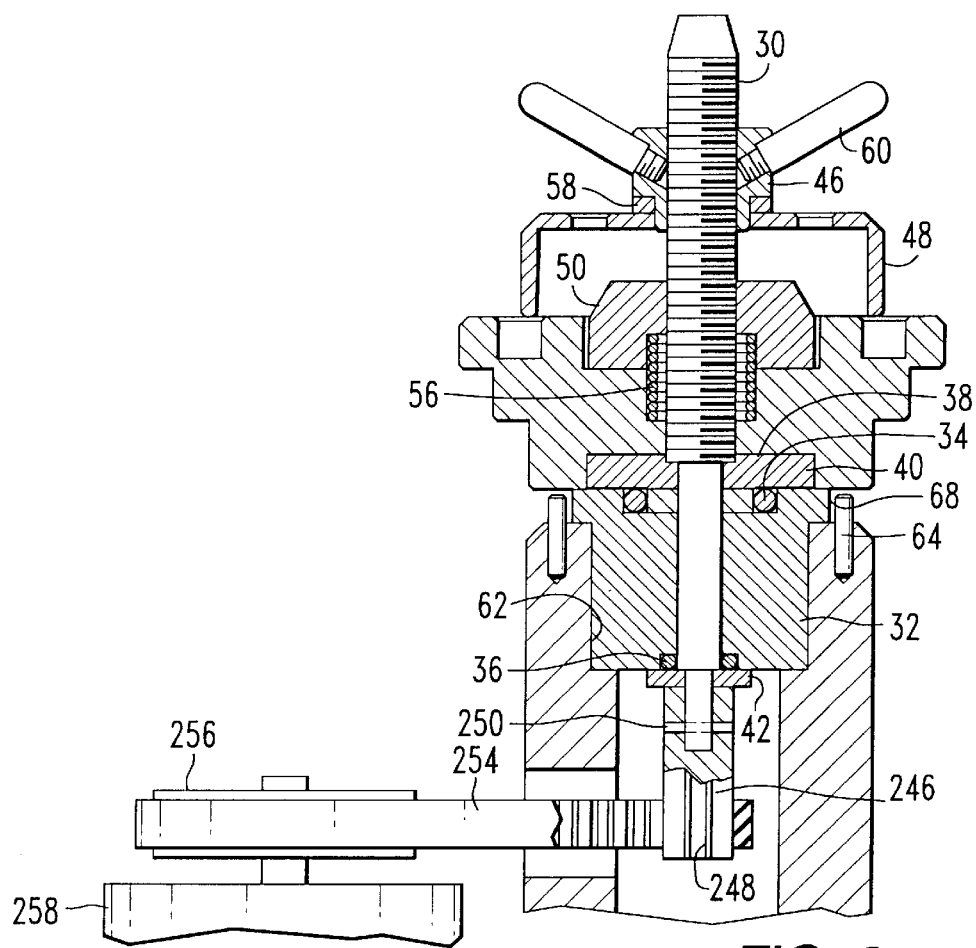
FIG. 6 is a cross-sectional view of the tire inspection and preparation device of FIG. 5.
Figure 7:
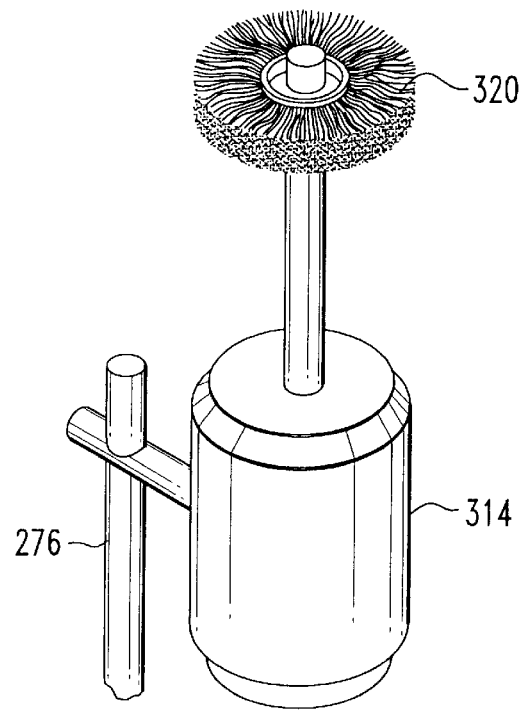
FIG. 7 is a partial isometric view of an alternative embodiment of the tire inspection and preparation device of FIG. 5 showing a motor attached to a scuffing tool.

Referring to FIGS. 1–3, a tire inspection and preparation device 10 is transportable and self contained for enabling the tire inspection and preparation device 10 to be used on tires at a race track. The tire inspection and preparation device 10 includes a mount 14 for supporting and rotating a tire 16 during measuring or repairing the tire 16. The mount 14 includes an elongated member 20 attached to a base 22 for elevating the tire 16 above a support surface, such as the ground. The elongated member 20 has several openings 24 disposed therethrough for reducing the overall weight of the tire inspection and preparation device 10.

The mount 14 further includes a rotatable member 26 for enabling the tire 16 to rotate with respect to the elongated member 20 and the ground. The rotatable member 26 includes a threaded shaft 30 disposed within a bearing housing 32, which contains a bearing 34 and a bearing 36 for rotational movement of the threaded shaft 30. A bearing spacer 38 is disposed between the bearing 34 and the threaded shaft 30. A backplate 40 retains the bearing 34 and a bearing cap 42 retains the bearing 36 within the bearing housing 32. A bolt 44 or other fastener secures the bearing cap 42 to the threaded shaft 30.

The threaded shaft 30 is threadedly engaged with a fastener, such as a lock nut 46. Positioned between the lock nut 40 and the bearing housing 32 and disposed on the threaded shaft 30 is a cap 48, a tire cone 50, and a tire base 52. The tire 16 is positioned between the cap 48 and the tire cone 50 and rests on the tire base 52. By tightening the lock nut 46 against the cap 48 enables the components of the rotatable member 26 to rotate as a unit within the elongated member 20.

A spring 56 is disposed on the threaded shaft 30 and is positioned between the tire cone 50 and the tire base 52 for absorbing vibration or impact. A spacer 58 is positioned between the lock nut 46 and the cap 48. A pair of handles 60 are attached to the lock nut 46 for enabling a person to grasp the handles 60 to tighten the lock nut 46.

By positioning the tire 16 within the rotatable member 26 and enabling the tire 16 to rotate as a unit with the rotatable member 26, the tire is securely supported by the mount and evenly balanced for providing accurate measurements of the tire 16 during inspection and preparation. The tire 16 rotates about an axis extending longitudinally through the elongated member 20.

The bearing housing 32 is positioned within a recess 62 of the elongated member 20 and is held in a stationary position by a pair of pins 64 attached to the elongated member 20 and engagable with recesses 68 in the bearing housing 32.

The elongated member 20 has a second recess 70 positioned at an opposite end of the elongated member 20 as the recess 62 for positioning of a first extension or base plug 72. The base plug 72 has a bore for insertion of a dowel pin 76, which is also inserted into a bore in the base 22. Pins 80 are inserted into bores in the elongated member 20 and into bores in the base 22 for preventing rotational movement of the elongated member 20.

The base 22 includes a first arm or first member 82 and a second arm or second member 84, which is positioned substantially perpendicular to the first member 82 for stabilizing the tire inspection and preparation device 10. The base 22 has a plurality of openings 86 for reducing the overall weight of the tire inspection and preparation device 10.

A bore 88 is positioned at each end of the first and second members 82 and 84 for insertion of a leveling pad 90. The leveling pad 90 has a base 92 for resting on the support surface, which is attached to a pivot 94, for enabling the base 92 to pivot with respect to the first and second members 82 and 84 to compensate for uneven support surfaces for positioning the tire 16 in a substantially level position. The pivot 94 is attached to a threaded rod 96, which is threadedly attached to a bushing 98, for adjusting the position of the base 92 with respect to the first and second members 82 and 84. The bushing 98 includes a flange 100 which has a diameter larger than the diameter of the bore 88 for supporting the base 22. The bushing 98 has a recess 102 for engagement with a ball set screw 104 positioned in the base 22 for retaining the bushing 98 within the bore 88, for example, when the base 22 is lifted above the support surface.

A support arm including a first arm 120 and a second arm 122 is slidably and removably attached to the mount 14 by a securement mechanism. Preferably, the first arm 120 is positioned within a recess positioned in the elongated member 20. The first arm 120 has a slot 126 engagable with a threaded pin 128 attached to the elongated member 20 and extending through the slot 126. A handle 130 is threadedly attached to the pin 128 and may be tightened to restrict movement of the first arm 120 or loosened to allow the pin 128 to slide within the slot 126 for sliding the first arm 120 within the recess of the elongated member 20. Lateral movement of the first arm 120 is restricted by the size of the slot 126.

The second arm 122 has a slot 132 and is slidably and removably attached to an extension portion 134 of the first arm 120 by a pin 136 disposed through the slot 132 and having a threaded portion for engagement with a handle 138. The second arm 122 is positioned substantially perpendicular to the first arm 120. Vertical movement of the second arm 122 is restricted by the size of the slot 132.

The second arm 122 has a pivot 140 for enabling a portion 142 of the second arm 122 to pivot away from the mount 14 or tire 16. The pivot 140 includes a slidable pin 144 or other connector mechanism for restricting or allowing pivotal movement of the portion 142 of the second arm 122.

A measuring tool, repair tool, or other tool may be attached to the second arm 122 of the support arm and extend substantially parallel to the first arm 120 for contacting the tire 16. The tools or other mechanisms are removable and interchangeable for enabling several inspection and preparation procedures to be performed on the tire 16 by using the same mount 14.

The first arm 120 may include graduated markings 146 for alignment with a reference marking 148 positioned on the elongated member 20 of the mount 14. The reference markings 146 correspond to various diameters of the tire 16 and provide a starting point for adjusting the position of the first arm 120 so that the measuring tool contacts the tire 16.

As one example of a measuring tool, a wheel assembly includes a contact wheel 150, which is rotatably attached to a bracket 152. The wheel 150 contacts the tire 16 and travels along the surface of the tire as the tire 16 rotates while supported by the mount 14 for measuring the circumference of the tire 16. The bracket 152 is removably attached to the second arm 122 by a connector, such as a pin 154 disposable within a bore of the second arm 122. The pin 154 has a recess 158 engagable with a ball set screw 160 positioned in the bore of the second arm 122.

A pointer arm 164 is attached to the bracket 152 and extends about and above the wheel 150 and has a reference marking 166 positioned at a point 168 of the pointer arm 164 for alignment with a reference marking 170 on the tire 16. The reference marking 170 on the tire 16 may be a tick or line marking printed on a piece of tape, which may be adhesively attached to the tire 16 in a desired location.

An adjustment means, such as a bolt 172 within a slot 174, is attached to the bracket 152 and to the wheel 150 for enabling adjustment of the wheel 150 with respect to the tire 16. At least one spring 176 is positioned contacting the bracket 152 and the wheel 150 for absorbing impact.

An encoder 180 is attached to the wheel 150 for detecting rotation of the wheel 150 about the circumference of the tire 16 and producing signal or signals indicative of the measurement of the circumference of the tire 16. The encoder 180 is electrically connected by wire 182 to a counter 186 for receiving the signals produced by the encoder 180 and determining and displaying the circumference of the tire 16.

The counter 186 is positioned on a support 190, which is attached to a base 192. Preferably, the support 190 positions the counter 186 at substantially the same height as the tire 16 or at a height convenient for a person to visually read the display of the counter 186. The support 190 may be one piece or may include a first portion 194 and a second portion 196 for enabling the support 190 to be taken apart during storage. The dowel pins 198 may be used for connecting together the first and second portions 194 and 196 and the support 190 to the base 192.

The base 192 includes openings 200 for reducing the overall weight of the support 190, and bores 202 for insertion of the leveling pads 90. A shelf may be attached to the support 190 for storage of a battery for supplying power to the counter 186 or for storage of the wheel assembly during non-use.

Referring to FIG. 2, the measuring tools may be connected to a computer 204 and to a printer 206 for providing a printout of the test results of the measuring tools. A sensor 208 may be positioned adjacent to the tire 16 for detecting the reference marking 170 on the tire 16 for providing a starting point and a stop point for determining one revolution of the tire 16.

For the various embodiments of this invention, the same reference characters will be used to designate like parts. In addition, like functions and like interactions of the parts among the various embodiments of this invention will not be repeated for each embodiment.

Alternative embodiments of this invention comprise the tire inspection and preparation device 10 employing various measuring, repairing, and preparation tools. In addition to functioning similarly to the embodiment illustrated in FIGS. 1–3, FIG. 4 illustrates the tire inspection and preparation device 10 employing a dial indicator 210 for contacting the tire 16 to measure and monitor run out of the tire 16.

The dial indicator 210 is attached to a bracket 212, which is removably attached to the second arm 122 of the support arm by a connector, such as pin 214 inserted through the bore of the second arm 122. The dial indicator 210 includes a wheel 218 which contacts the tire 16 and travels along the surface of the tire as the tire 16 rotates about the mount 14.

Referring to FIGS. 5–8 and using the same reference characters to define like parts, an alternative embodiment of the tire inspection and preparation device 10 as illustrated in FIGS. 1–4 may be a tire inspection and preparation device 240 having like parts as the mount 14 of the tire inspection and preparation device 10 and additionally having a motor assembly coupled to the rotatable member 26 of the mount 14 and a preparation tool attached to the support arm.

The threaded shaft 30 extends through the bearing cap 42 and into a shaft 246 with pulley teeth 248. The pulley shaft 246 may be attached to the threaded shaft 30 by a spring pin 250 inserted through the pulley shaft 246 and through the threaded shaft 30.

The motor assembly includes a belt 254 engagable with the pulley teeth 248 of the shaft 246 for automatic rotation of the rotatable member 26. The belt 254, which extends through an opening in the elongated member 20, is coupled to a driver pulley 256, which is attached to a gear reducer 258. The gear reducer 258 is attached to a motor 260, which is electrically connected to a control box 262. The motor assembly is secured to the mount, such as by bracket 270 attached to the elongated member 20. An indicator light may be attached to the on/off switch of the motor for enabling a person to visually determine that power is being supplied to the motor assembly.

As an alternative to the use of first and second arms 120 and 122, a first arm 274 and a second arm 276 having the shape of a rod as compared to the bar shape of the first and second arms 120 and 122 may provide the support arm for the preparation tool. As an alternative to the attachment of the first arm 120 of the support arm to a recess positioned on the outside diameter of the elongated member 20, the first arm 274 may be inserted through a hole 278 in the walls of the elongated member 20 for providing additional stability to the support arm. The hole 278 may be circular for corresponding to a cylindrical shape of the first arm 274, and the hole 278 and the first arm 274 may have a flat 280 for preventing rotational movement of the first arm 274 within the hole 278.

The first arm 274 is adjustably and removably secured to the elongated member 20 by sliding the first arm 274 through the hole 278 and securing the first arm 274 in a fixed position by tightening a handle attached to a threaded pin positioned within a slot 282 in a flat surface of the first arm 274. The second arm 276 is adjustably and removably attached to an extension portion 284 of the first arm 274 by sliding the second arm 276 through a hole 286 in the extension portion 284. The second arm 276 is secured in a fixed position by tightening a handle 288 attached to a threaded pin positioned within a slot 290 in a flat surface of the second arm 276.

The preparation tool may be a cleaning tool, such as a cutting tool 294 attached to the second arm 276 for contacting the tire 16 for removing debris from the tire 16 deposited from a race track during racing of an automobile. The cutting tool 294 includes a handle 300, a cutting portion 302, and a pivot bushing 304. The pivot bushing 304, such as a spherical bearing, has a bore 308 sized and adapted to fit on the second arm 276 for enabling lateral rotation of the cutting tool 296 by a person grasping the handle 300. The pivot bushing 304 is contained within a pivot housing 310 for enabling vertical rotation of the cutting tool 296 facilitating adjustment of the cutting tool 296 for access to substantially all surfaces of the tire 16 as the tire rotates within the mount 14. The cutting portion 302 may be an insert which is threaded into a support portion of the cutting tool 296 and retained in position with two socket head cap screws. The cutting portion 302 is removable enabling the cutting edge to be sharpened.

As an alternative to the attachment of the preparation tool to the second arm 276, the preparation tool may be coupled to a motor 314, which is attached to the second support arm 276 for automatically rotating the tool, eliminating the need for a person to operate the preparation tool. As an example, the preparation tool may be wire wheel 320, emery wheel or other scuffing tool for marking or roughing up the surface of the tire so that the adherence of the tire to the track is improved.

In operation, the leveling pads 90 are disposed in the bores 88 of the base 22 and adjusted for leveling the base 22 with respect to the support surface. The base plug 72 is attached to the base 22 by pin 74. The elongated member 20 is positioned over the base plug 72 and the pins 76 prevent rotation of the elongated member 20 with respect to the base 22.

The bearing housing 32 along with the threaded shaft 30 are positioned within the recess 62 of the elongated member 20 and the pins 64 engage the recesses 68 of the bearing housing 32 for preventing rotation of the bearing housing 32. The threaded shaft 30 rotates within the bearing housing 32.

The tire base 52 is disposed on the threaded shaft 30 and abuts the backplate 40 of the bearing housing 32. The spring 56 is positioned within a recess in the tire base 52 and the tire cone 50 is disposed thereon. The tire 16 is positioned on the tire cone 50 and the cap 48 is positioned on top of the tire 16. The lock nut 46 is tightened onto the cap 48 for securing the tire 16 between the tire cone 50 and the cap 48, and enabling the tire 16 to rotate as a unit with the rotatable member 26.

The handle 60 is loosened for adjusting the position of the first arm 120 to align one of the graduated markings 146 indicative of the diameter of the tire 16 with the reference marking 148 on the elongated member 20 to provide a starting point for aligning the measuring tool in contact with a surface of the tire 16. Tightening of the handle 60 secures the position of the first arm 120 in the desired location.

The handle 130 is loosened for adjusting the position of the second arm 122 to alter the height of the measuring tool with respect to the tire 16.

Alternatively, the handles are manipulated to adjust the first and second arms 274 and 276 for aligning the cutting tool 294 or wire wheel 320 with the tire 16.

The desired measuring tool or preparation tool, such as the contact wheel 150 or dial indicator 210, is attached to the second arm 122. For use of the contact wheel 150, the wire 182 is connected to the counter 186. For use of the cutting tool 294 or wire wheel 320, the belt 254 is coupled to the shaft 246 and the motor assembly is attached to the elongated member 20.

Referring to FIGS. 5–8 and using the same reference characters to define like parts, an alternative embodiment of the tire inspection and preparation device 10 as illustrated in FIGS. 1–4 may be a tire inspection and preparation device 240 having like parts as the mount 14 of the tire inspection and preparation device 10 and additionally having a motor assembly coupled to the rotatable member 26 of the mount 14 and a preparation tool attached to the support arm.

Figure 9:
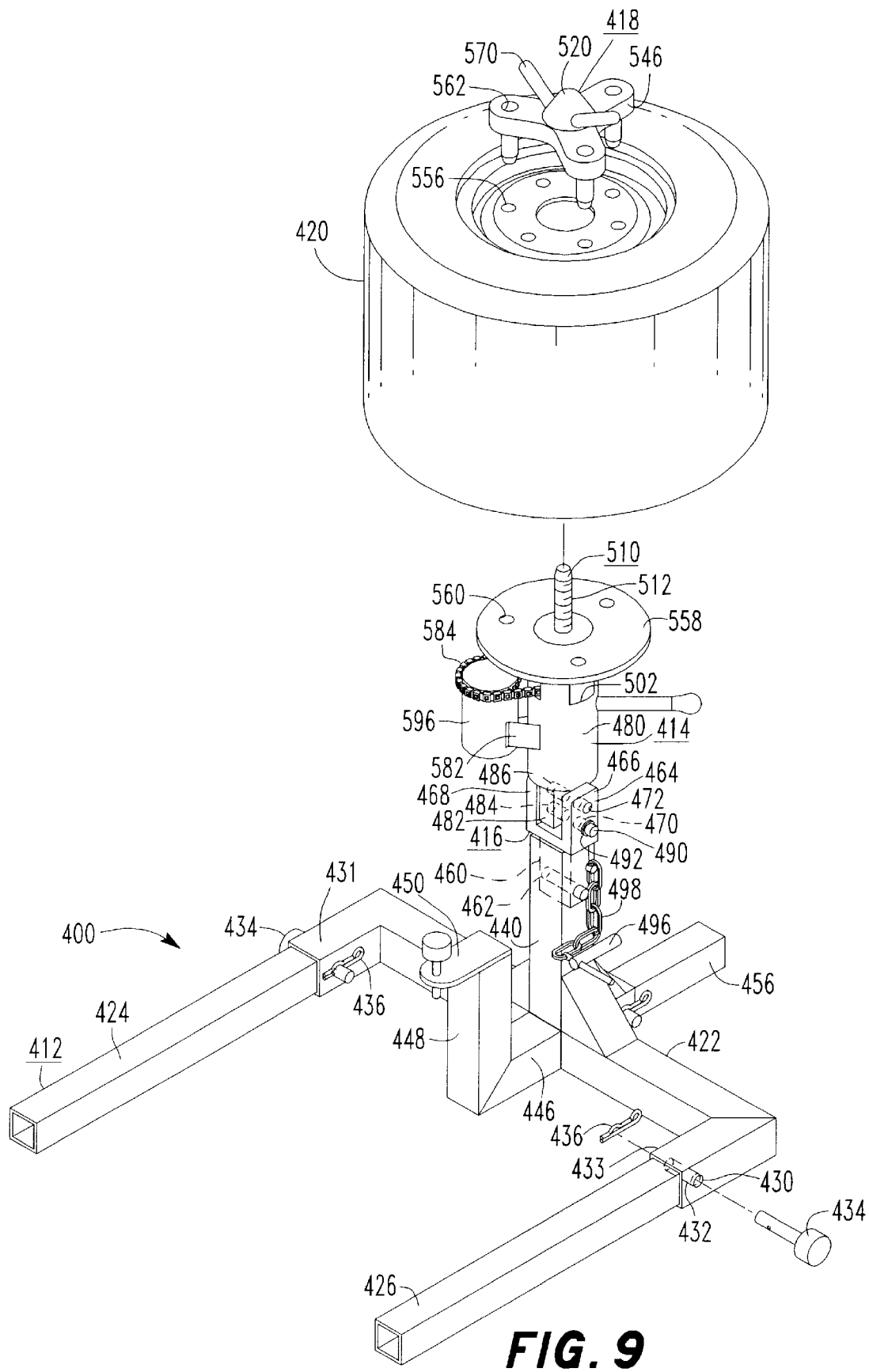
FIG. 9 is a partially exploded isometric view of an alternative embodiment of a mounting system.
Figure 10:
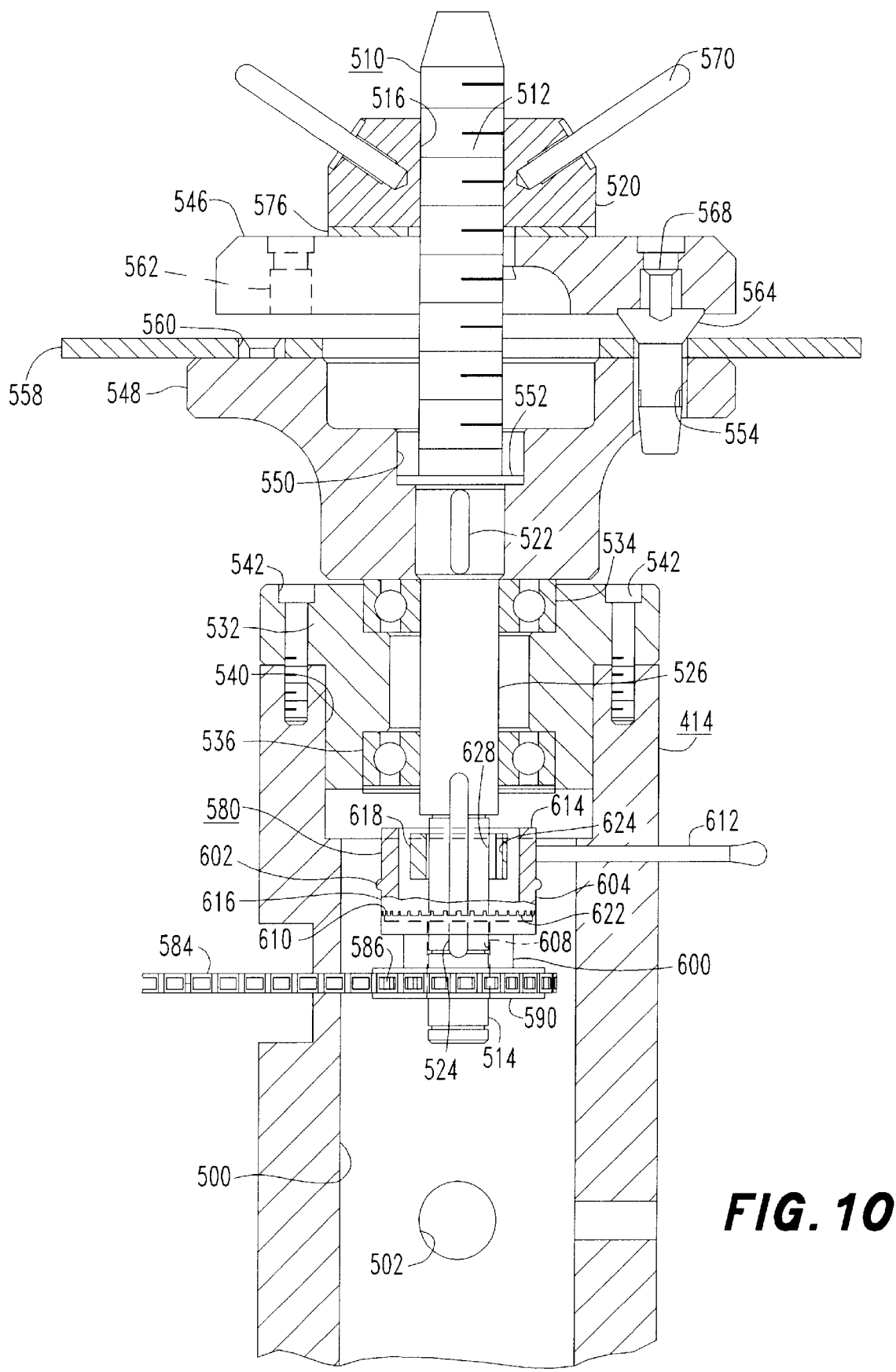
FIG. 10 is a cross-sectional view of the mounting system of FIG. 9.
Figure 11:
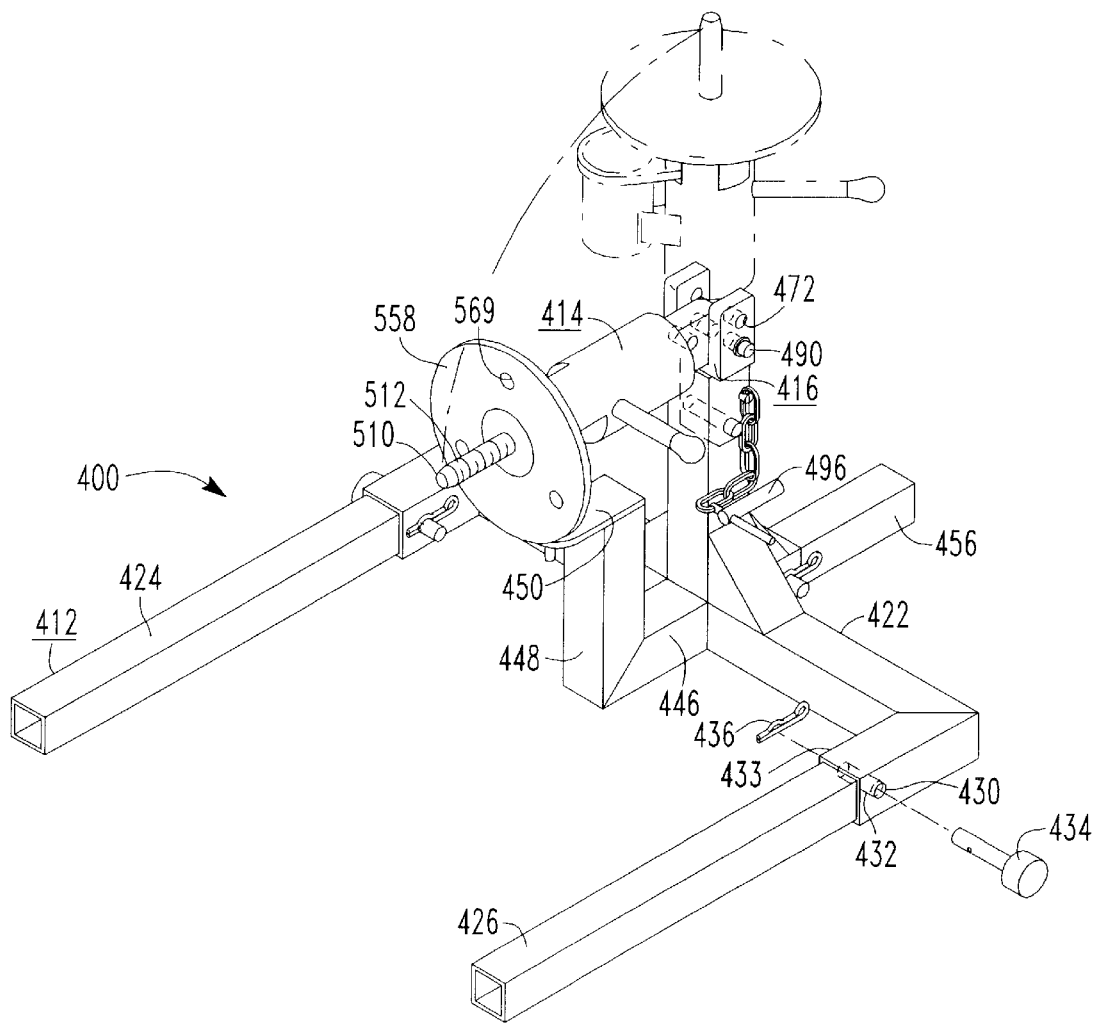
FIG. 11 is an isometric view of the mounting system in a pivoted position.

Referring to FIGS. 9 and 10 and using the same reference characters to define like parts, an alternative embodiment of the mounting system of FIGS. 1–8 may be a mounting system, such as a portable, rotatable tire support 400. The tire support 400 includes a base 412 which rests on a support surface, such as the ground or floor of a building, a mount 414 for supporting a tire in spaced apart relation to the support surface, a connector 416 for providing a pivotal attachment between the base 412 and the mount 414, and a fastener 418 for securing the tire to the mount 414. A tire 420 is positioned between the fastener 418 and the mount 414 and may be rotated either while positioned horizontally when the mount 414 is in an upright position or while positioned vertically when the mount 414 is pivoted and in a horizontal position. The angular position of the tire 420 may be adjusted for conveniently performing various procedures on the tire 420.

To transport or store the tire support 400, the components can be disassembled and placed in a storage container, such as a box or carrying case.

The base 412 includes a first arm 422, a second arm 424 and a third arm 426 which rest on the support surface. The second and third arms 424 and 426 are positioned parallel to one another. The second and third arms 424 and 426 are attached to opposite ends of the first arm 422 and may be positioned substantially perpendicular to the first arm 422 for providing a stable support. The first, second and third arms 422, 424 and 426 may be formed of hollow or solid steel tubular members, rods, or the like. Preferably, the arms 422, 424 and 426 are formed of hollow steel tubing having different dimensions for enabling the second and third arms 424 and 426 to either slid within or over the ends of the first arm 422 for assembling the arms 422, 424 and 426 into a U-shape.

The first arm 422 has a bore 430 positioned at each end 431 of the first arm 422. The second and third arms 424 and 426 each have a bore 432 positioned at one end 432. A pin 434 may be inserted into the aligned bores 430 and 432 and secured with a clip 436 for attaching together the first, second and third arms 422, 424, and 426. The clip 436 and pin 434 are removable for enabling first, second and third arms 422, 424, and 426 to be disassembled for storage and transportation of the tire support. As an alternative to the use of a pin and clip, any other type of fastening system may be used.

The base 412 further includes a first extension 440, which is attached to the first arm 422 and extends vertically upwardly and substantially perpendicular to said first arm 422. The first extension 440 has a first bore 442 sized to receive the pin 434. A fourth arm 446 is positioned resting on the support surface and is attached to the first arm 422.

The fourth arm 446 is positioned perpendicular to the first arm 422 and parallel to the second arm 424 and the third arm 426. A second extension 448 may be attached to a fourth arm 448 and extends vertically upwardly and substantially perpendicular to the fourth arm 446 and parallel to the first extension 440. The second extension 448 has a support surface 450 for supporting the tire support when the tire support is in a pivoted position. As an example, the support surface 450 may be a piece of steel channel, a rubber bumper, or the like.

A fifth arm 456 may be attached to the first arm 422 or integrally formed with the fourth arm 446. The fifth arm 556 extends perpendicular to the first arm 422 and parallel with the fourth arm 446 and is positioned resting on the support surface. The first, second, third, fourth and fifth arms 422, 424, 426, 446 and 456 and the first and second extensions 440 and 448 may be integrally formed together or may be separate components which may be attached together.

The connector 416 may be integrally formed with the base 14 or a separate component. The connector 416 has a first end 460, preferably, formed of hollow tubing for engagement with the first extension 440. The first end 460 has a bore 462 sized for insertion of the pin 434 through the aligned bores 442 and 462 for securing the connector 416 to the base 412. The connector 416 has a second end 464 having a first fork portion 466 and a second fork portion 468. Each of the first and second fork portions 466 and 468 has a first bore 470 and a second bore 472.

The mount 414 includes an elongated member 480 having a protuberance 482 which is mateably connectable with the second end 464 of the connector 416. The protuberance 482 is positioned between the first fork portion 466 and the second fork portion 468. The protuberance 482 has a first bore 484 aligned with the first bore 470 of the first and second fork portions 466 and 468, and a second bore 486 aligned with the second bore 472 of the first and second fork portions 466 and 468.

A connector pin 490 is disposed through the aligned first bores 470 and 484 of the first and second fork portions 466 and 468 and of the protuberance 482 of the mount 414 for providing a pivot for the mount 414. The connector pin 490 is held in position by a fastener, such as washers 492.

A pin 496 is attached to a chain 498, which is attached to the first extension 440 of the base 412, to the connector 416, or to any other suitable component of the tire support 400. The pin 496 is sized to be disposed through the second bores 472 of the first and second fork portions 466 and 468 and through the second bore 486 of the protuberance 482 of the mount 414. When the pin 496 is inserted through the second bores 472 and 486, the elongated member 480 is held in a stationary upright position. When the pin 496 removed from the second bores 472 and 486, the elongated member 480 is free to pivot and rotate about the connector pin 490. The mount 414 may be rotated approximately 90° for positioning the tire either horizontally or vertically with respect to the ground. As an alternative, any other type of pivotal attachment may be used.

The elongated member 480 has a bore 500 at least partially therethrough and has several openings 502 disposed therethrough for reducing the overall weight of the tire support 400.

The mount 414 further includes a rotatable member 510 for enabling the tire 420 to rotate with respect to the elongated member 480 and the ground. The rotatable member 510 includes a threaded shaft, which has a first end 512 and a second end 514, and is disposed within the bore 500 of the elongated member 480. The first end 512 of the rotatable member 510 includes a threaded portion 516, which is threadedly engagable with a lock nut 520. The second end 514 of the threaded shaft 516 includes a first keyway 522. A second keyway 524 and a cylindrical portion 526 are positioned between the first and second ends 512 and 514 of the threaded shaft 510. The cylindrical portion 526 is disposed within a bearing housing 532, which contains a bearing 534 and a bearing 536 for rotational movement of the rotatable member 510 within the bore 500 of the elongated member 480. The bearing housing 532 is positioned within a recess 540 and attached by socket head cap screws 542 to the elongated member 480. Alternatively, any other type of rotational system may be used.

A cap 546 and a tire base 548 are positioned between the lock nut 520 and the bearing housing 532 and are disposed on the threaded portion 516 of the rotational member 510. The tire 420 is positioned between the cap 546 and the tire base 548 and rests on the tire base 548. The tire base 548 has a recessed bore 550 for seating a shoulder 552 of the threaded shaft 516 and, preferably, has either three or five alignment holes 554 which correspond to holes in the wheel of the tire 420. The tire base 548 is secured to the threaded shaft 516 by engagement with the first keyway 522 of the threaded shaft 510.

The tire base 548 includes a plate 558 which may be integrally formed therewith or a separate component attached to the tire base 544. The plate 558 may vary in diameter depending on the size of the wheel of the tire. The plate 558 and the cap 546 have, preferably, either three or five alignment holes 560 and 562, respectively, which also correspond to holes in the wheel of the tire 420 and to the alignment holes 554 of the tire base 548.

An alignment pin 564 is sized to be disposed through each of the alignment holes 554, 560, and 562 and through the holes 556 in the wheel of the tire 420. As one example, the alignment pin 564 includes a screw 568 which is threaded into an internally threaded bore of the alignment pin 564. The screw 568 is threaded into the cap 546 and into the alignment pin 564 enabling the alignment pins 564 to remain attached to the cap 546 during disassembly. The screw 568 may be a flat head screw, a shoulder screw or the like and seat within a countersink of the cap 546. The tire base 548, the cap 546, the alignment pins 564 and the lock nut 520 may be considered to be a fastener which secures the tire 420 to the tire support device 400 and which rotate along with the rotatable member 510 as a single unit. As an alternative, any other type of fastening system may be used.

A pair of handles 570 are attached to the lock nut 520 for enabling a person to grasp the handles 570 to tighten the lock nut 520. The lock nut 520 is attached to the cap 546 by a snap ring 572. The lock nut 520 is rotatable with respect to the cap 546. A washer 576 is positioned between the lock nut 520 and the cap 546 to prevent metal to metal contact between the lock nut 520 and the cap 546.

By aligning and securing the wheel of the tire 420 to the rotatable member 510, enables the tire 420 to rotate as a unit with the rotatable member 510 and the tire to be securely supported by the mount and evenly balanced for providing accurate measurements of the tire 420 during inspection and preparation. When the elongated member 480 is in an upright position, the tire 420 rotates about an axis extending longitudinally through the elongated member 480. The axis is positioned perpendicular to the support surface enabling the tire to be positioned and rotated horizontally. When the elongated member 480 is pivoted, the tire rotates about an axis extending longitudinally through the elongated member 480. In the pivoted position, the axis is positioned parallel to the support surface enabling the tire to be positioned and rotated vertically.

A clutch 580 is positioned within the bore 500 of the elongated member 480 and is coupled to a motor assembly. The clutch 580 is secured to the rotational member 510 by engagement with the second keyway 524. The motor assembly is secured to the mount, such as by a bracket 582 attached to the elongated member 480. The motor assembly includes a belt or chain 584 engagable with the teeth 586 of a sprocket 590, which is permanently welded to the second end 514 of the rotatable member 510 for automatic rotation of the rotatable member 510. The chain 584, which extends through an opening in the elongated member 480, is coupled to a driver pulley or sprocket 590, which is attached to a motor 596.

The clutch 580 includes a first portion 600 and a second portion 602. The first portion 600 has a bore 608 for insertion of the rotational member 510, a first end which is permanently attached to the sprocket 590, and a second end which has teeth 610. The second portion 602 has a clutch handle 612, an upper portion 614, a lower portion 616, and an inner rotational portion 618. The upper portion 614 remains stationary and has the handle 612 disposed therethrough. The lower portion 616 is coupled to the upper portion 614 and has teeth 622 threadedly engagable with the teeth 610 of the first portion 600 of the clutch 580. The inner rotational portion 618 has a keyway 624 mateably engagable with a key 628 on the rotational member 510. The clutch handle 612 includes a key with two radiuses. When the handle 612 is in the up position, the first and second portions 600 and 602 are disengaged and the inner rotational portion 618 floats or rotates. When the handle 612 is in the down position, the teeth 610 and 622 are engaged.

In operation, the base 412 is assembled by using the pins 434 and clips 436. The connector 416 is attached to the base 412 and secured with the pin 434 and clip 436. The mount 414 is positioned within the forked portion 466 and 468 of the connector 416 and the connector pin 490 is inserted through the aligned bores 470 and 484 of the connector 416 and the protuberance 482. The pin 496 is inserted through the bores 472 and 486 of the protuberance 482 and the connector 416 for stabilizing the mount 414 in an upright position.

The tire 420 is positioned on the plate 558 of the tire base 548 and the holes 556 of the wheel of the tire 420 are aligned with the holes 554 in the tire base 548. The cap 546 is positioned on the wheel of the tire 420 and the alignment pins 564 extending through the holes 562 of the cap 546 are disposed through the holes 556 of the wheel and through the holes 554 of the tire base 548 for securing the tire 420 in position. The lock nut 520 is tightened by using the handles 570 for securing the tire 420 to the mount 414. By threading the lock nut 520 onto the threaded shaft 516 of the rotatable member 510 enables the cap 546 be tightened against the tire 420 for enabling the components of the rotatable member 510 to rotate as a unit within the elongated member 2580.

The clutch 580 is positioned so that the motor 596 may be engaged or disengaged for automatically or manually rotating the tire 420. The pin 496 may remain within the holes 472 and 486 of the protuberance 482 and the connector 416, or the pin 496 may be removed and the mount 414 pivoted until the elongated member 480 rests on the support surface 450 of the base 412 for supporting the mount 414 in a pivoted position.

An advantage of the tire inspection and preparation device 10 or 240 or tire support 400 is that it is a self contained apparatus eliminating the need for additional supports or rotation means. The tire inspection and preparation device 10 or 240 or tire support 400 can conveniently be used at a race track or other location.

Another advantage is that the components of the tire inspection and preparation device 10 or 240 and tire support 400 can be disassembled and easily and compactly transported or stored. The components could be placed in a storage case.

By using the contact wheel 150, the encoder 180, and the counter 186, the tire inspection and preparation device 10 accurately measures the circumference of the tire 10. The circumference can be read from the counter 186 or the run out can be monitored with the dial indicator 210. The leveling pads used to adjust the position of the tire for substantially balancing and leveling the tire enables accurate measurements to be read.

By automatically rotating the tire 16 or 420, the time to clean or scuff the tire 16 or 420 is reduced and the quality of the repair is improved. Automatic operation of the preparation tool improves the efficiency of the tire inspection and preparation device.

Another advantage of the tire support 400 is that the tire 16 or 420 may be pivoted while mounted within the tire support 400, enabling the tire 16 or 420 to be easily positioned in various positions. A person can conveniently work on the tire and has access to the treaded surface of the tire in either a horizontal position or a vertical position.

Thus there has been shown and described a novel tire support which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A portable, rotatable tire support for mounting a tire, comprising:

a base having a first arm, a second arm, and a first extension, said first and second arms resting on a support surface and having said second arm removably attached to said first arm and positioned substantially perpendicular to said first arm, said first extension attached to said first arm and extending substantially perpendicular to and vertically upwardly from said first arm;

a mount removably attached to said first extension of said base and having an elongated member attached to said first extension and extending substantially vertically upwardly for supporting said tire in spaced apart relation to said support surface, a rotatable member rotatably attached to said elongated member for rotating said tire about an axis; and a fastener coupled to said rotatable member and rotatable with said rotatable member for securing said tire between said elongated member and said fastener and enabling rotation of said tire, said fastener and said rotatable member.

2. The tire support according to claim 1, wherein said mount is pivotally attached to said base, said pivotal attachment providing pivotal movement through approximately 90° for enabling said tire to be positioned both horizontally and vertically with respect to said support surface.

3. The tire support according to claim 2, wherein said pivotal attachment further comprises:
   a connector having a first bore and a second bore;
   said mount having a protuberance mateable with said connector and having a first bore and a second bore which are alignable with said first and second bores of said connector;
   a connector pin disposed within said first bores of said connector and said mount for enabling said mount to rotate about said connector pin; and
   a pin engagable within said second bores of said connector and said mount for securing said mount in an upright, non-pivoted position.

4. The tire support according to claim 1, wherein said tire includes a wheel having at least one hole therethrough, said fastener further comprising:
   a tire base having at least one hole alignable with said at least one hole of said wheel of said tire, said tire base rotatably attached to said elongated member;
   a cap having at least one hole alignable with said at least one hole of said wheel of said tire; and
   an alignment pin sized and adapted to be disposed through each of said aligned holes of said wheel, said cap, and said tire base for coupling said tire and said rotatable member together.

5. The tire support according to claim 1, further comprising a motor attached to said rotatable member for rotating said rotatable member and said tire.

6. The tire support according to claim 5, further comprising a clutch attached to said rotatable member and to said motor and having a first position for enabling said rotatable member to be manually rotated and having a second position for enabling said rotatable member to be rotated automatically with said motor.

7. The tire support according to claim 2, further comprising a second extension attached to said base and extending vertically upwardly and substantially perpendicular to said first arm and extending substantially parallel to said first extension, said second extension having a support surface for contacting said elongated member of said mount for supporting said mount in a pivoted position.

8. The tire support according to claim 1, further comprising:
   said first arm having a first end and a second end each having a bore at least partially therethrough;
   a third arm positioned resting on said support surface and extending substantially parallel to said second arm and substantially perpendicular to the first arm, said third arm having a first end and a second end, one of said first and second ends having a bore at least partially therethrough and attached to one of said first and second ends of said first arm;
   said second arm having a first end and a second end, one of said first and second ends having a bore at least partially therethrough and attached to the other of said first and second ends of said first arm; and
   a pin disposed through each aligned said bores of said first and second arms and through each aligned said bores of said first and third arms.

9. A portable motorized tire support for supporting a tire including a wheel having at least one hole therethrough, comprising:
   a base for supporting said tire support on a support surface;
   an elongated member pivotally attached to said base for supporting said tire in spaced apart relation to said support surface;
   a rotatable member rotatably attached to said elongated member for rotating said tire about an axis;
   a tire base having at least one hole alignable with said at least one hole of said wheel of said tire, said tire base rotatably attached to said elongated member;
   a cap having at least one hole alignable with said at least one hole of said wheel of said tire; and
   an alignment pin sized and adapted to be disposed through each of said aligned holes of said cap, said wheel of said tire, and said tire base for coupling said tire and said rotatable member together when said tire is positioned on said rotatable member and positioned between said cap and said tire base.

10. The tire support according to claim 9, further comprising a motor attached to said rotatable member for rotating said rotatable member and said tire.

11. The tire support according to claim 10, further comprising a clutch attached to said rotatable member and to said motor and having a first position for enabling said rotatable member to be manually rotated and having a second position for enabling said rotatable member to be rotated automatically with said motor.

12. The tire support according to claim 9, wherein said base has a first arm, a second arm, a third arm, and a first extension, said first, second and third arms positioned resting on a support surface, said second and third arms removably attached to said first arm and positioned substantially parallel to one another and substantially perpendicular to said first arm, said first extension attached to said first arm and extending substantially perpendicular to and vertically upwardly from said first arm.

13. The tire support according to claim 9, further comprising:
   a connector mateable with said elongated member and having a first bore and a second bore;
   said elongated member having a protuberance mateable with said connector of said base and having a first bore and a second bore which are alignable with said first and second bores respectively of said connector;
   a connector pin disposed within said first bores of said connector and said elongated member for enabling said mount to rotate about said connector pin; and
   a pin engagable within said second bores of said connector and said mount for securing said mount in an upright, non-pivoted position.

14. The tire support according to claim 9, further comprising a second extension attached to said base and extending vertically upwardly and substantially perpendicular to said first arm and substantially parallel to said first extension, said second extension having a support surface for contacting said elongated member for supporting said elongated member in a pivoted position.

15. The tire support according to claim 9, wherein said pivotal attachment of said elongated member to said base provides pivotal movement through approximately 90° for enabling said tire to be positioned both horizontally and vertically with respect to said support surface.

16. A portable motorized tire support for mounting a tire, comprising:
   a base having a first arm, a second arm, a third arm, and a first extension, said first, second and third arms positioned resting on a support surface, said second and third arms removably attached to said first arm and positioned substantially parallel to one another and substantially perpendicular to said first arm, said first extension attached to said first arm and extending substantially perpendicular to and vertically upwardly from said first arm;

a mount removably attached to said extension of said base and having an elongated member with a bore at least partially therethrough for supporting a tire in spaced apart relation to said support surface, a rotatable member disposed within said bore of said elongated member and rotatably attached to said elongated member for rotating said tire about an axis, and a fastener coupled to said rotatable member and to said tire for securing said tire to said mount, said mount pivotally attached to said base enabling said tire to be positioned substantially parallel to said support surface while said mount is positioned upright in a non-pivoted position and to be pivoted through approximately 90° for positioning said tire substantially perpendicular to said support surface while said mount is positioned in a pivoted position;

a motor attached to said rotatable member for rotating said rotatable member and said tire; and a clutch attached to said rotatable member and to said motor and having a first position for enabling said rotatable member to be manually rotated and having a second position for enabling said rotatable member to be rotated automatically with said motor.

17. The portable motorized tire support according to claim 16, wherein said pivotal attachment of said mount to said base comprises:

a connector mateable having a first end connectable with said base and having a forked portion with a first bore and a second bore;

said mount having a protuberance mateable with said forked portion of said connector of said base and having a first bore and a second bore which are alignable with said first and second bores respectively of said connector; and a connector pin disposed within said first bores of said connector and said mount for enabling said mount to rotate about said connector pin.

18. The tire support according to claim 16, further comprising a pin engagable within said second bores of said connector and said mount for securing said mount in an upright, non-pivoted position.

19. The portable motorized tire support according to claim 16, further comprising a second extension attached to said base and extending vertically upwardly and substantially perpendicular to said first arm and substantially parallel to said first extension, said second extension having a support surface for contacting said elongated member of said mount for supporting said mount in a pivoted position.

20. The rotatable tire support according to claim 16, wherein said tire includes a wheel having at least one hole therethrough, said fastener further comprising:

a tire base having at least one hole alignable with said at least one hole of said wheel of said tire, said tire base rotatably attached to said elongated member;

a cap having at least one hole alignable with said at least one hole of said wheel of said tire; and an alignment pin sized and adapted to be disposed through each of said aligned holes of said wheel and said tire base for coupling said tire and said rotatable member together.

* * * * *